(No Model.)
3 Sheets—Sheet 3.
G. McKAY.
LASTING MACHINE.
No. 263,346. Patented Aug. 29, 1882.
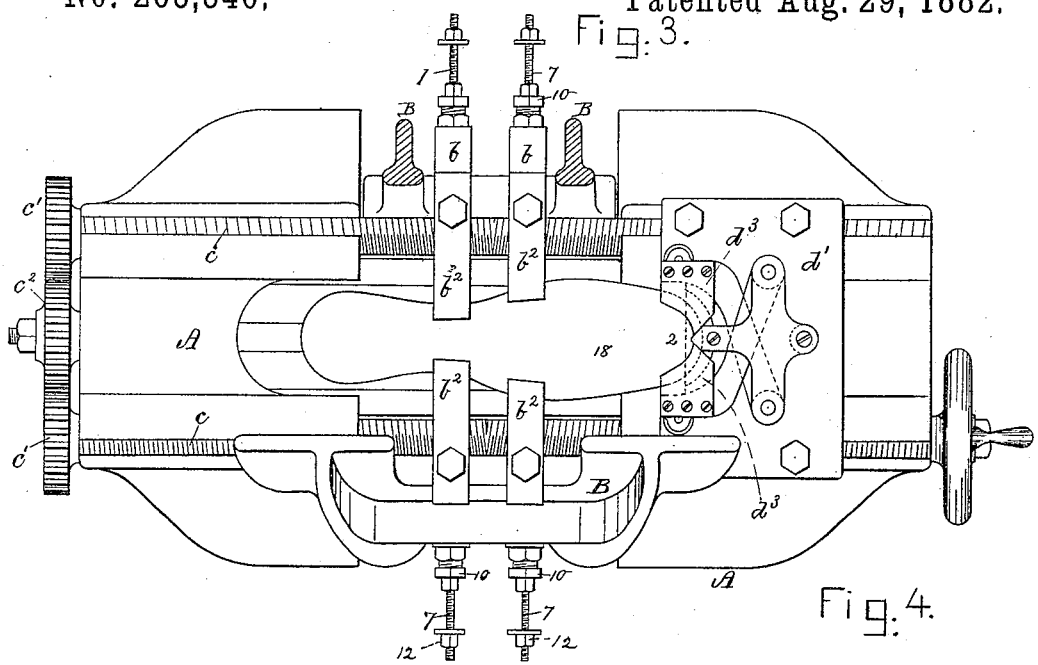
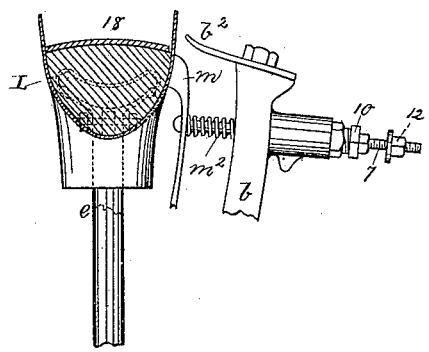
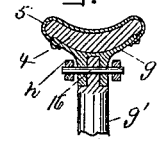
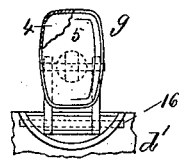
Witnesses:
W. H. Sigston.
John F. L. Prankert
Inventor.
Gordon McKay
by Crosby & Gregory
Attys.

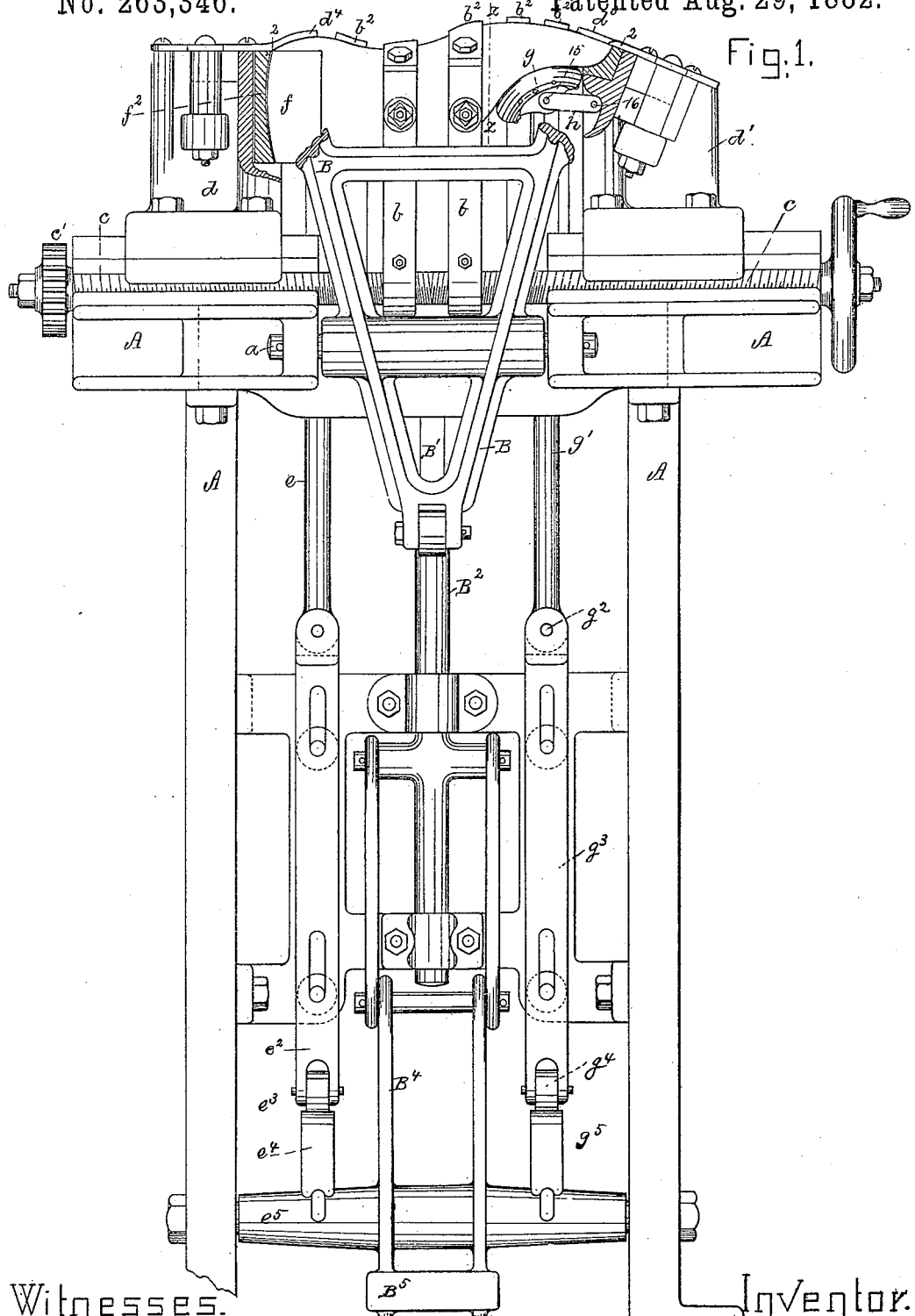

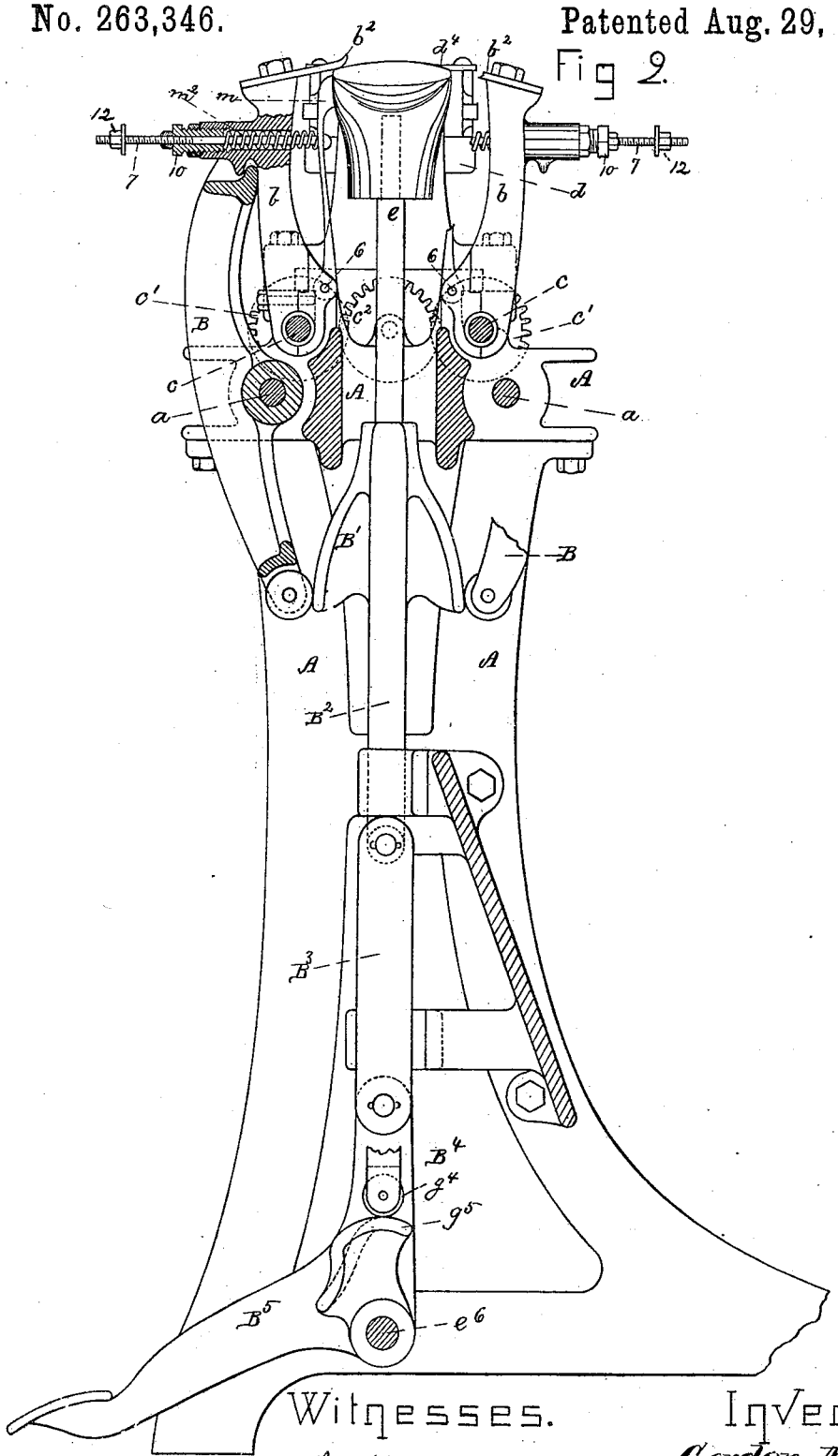

UNITED STATES PATENT OFFICE.

GORDON McKAY, OF NEWPORT, RHODE ISLAND.

LASTING-MACHINE.

SPECIFICATION forming part of Letters Patent No. 263,346, dated August 29, 1882.

Application filed February 20, 1882. (No model.)

*To all whom it may concern:*

Be it known that I, GORDON MCKAY, of Newport, county of Newport, State of Rhode Island, have invented an Improvement in Lasting-Machines, of which the following description, in connection with the accompanying drawings, is a specification.

This invention relates to a lasting-machine wherein the upper is drawn over the last by pinchers, preferably operated by hand, as in hand-lasting, and has for its object improvements in mechanism whereby the upper may be prevented from slipping back on the last when once stretched or drawn closely about it by the pinchers, after which the edges of the stretched upper may be forced over upon the inner sole by the side-lasting devices.

The upper of the shoe, near the center of the top or hollow part of the foot of the last, or near its median line, is pressed closely in contact with the last by a presser, which I have herein shown as made adjustable with the toe-rest.

Figure 1 represents in side elevation a lasting-machine containing my improvements; Fig. 2, a broken sectional view thereof, the toe-rest and its carriage being removed, one of the side levers being but partially shown therein, and the presser being broken off to show the heel-carriage; Fig. 3, a top view of Fig. 1, with the heel-carriage and jaws omitted; Figs. 4, 5, and 6, details of the presser which bears upon the upper at the top of the foot of the last; and Fig. 7 is a cross-section taken through the last and upper thereon on the line $z$, showing the upper as being acted upon by the holder, the presser being shown in dotted line.

The frame-work A, of suitable shape to sustain the working parts, has mounted upon it two levers, B B, one of which in Fig. 2 is mostly broken away. These levers are turned on their fulcra $a$ by the wedge B' at the upper end of the rod B$^2$, which is reciprocated by the upper links, B$^3$, of the toggle-joint, of which the arms B$^4$, treadle B$^5$, and sleeve $e^5$ form the other co-operating part. The levers B at their upper ends act upon and close and open the arms $b$ $b$, which carry the usual side-lasting plates or devices, $b^2$. These arms $b$ have their fulcra on the parallel screws $c$ $c$, mounted in bearings on the frame-work, and having gears $c'$ $c'$, which are in mesh with an intermediate gear, $c^2$, so that the two screws $c$ $c$ will turn in unison. These screws have right and left hand threads, which are made to engage with screw-threaded parts of the heel and toe carriages $d$ $d'$, of usual construction, to reciprocate them in unison in opposite directions. The parts of the screws $c$ $c'$ which support the arms $b$ have screw-threads differing in pitch from those which engage the carriages $d$ $d'$, so that the said arms $b$, according to their location along the side of the last and their position with relation to the longitudinal axis of the last between its heel and toe, are adapted to be moved at different speeds, according to their distance from the center of the last—the farther they are from the said center the faster their movement—to thereby enable the said arms to adapt themselves to different sizes of lasts and always occupy the same proper relative position at the sides of the last. The heel-pin $e$, which holds the last, is pivoted at the upper end of a rod, $e^2$, having a roll, $e^3$, which at the proper time is acted upon by a cam, $e^4$, on the sleeve $e^5$, sustained by rod $e^6$, the sleeve being fixed with relation to the arms B$^4$ and treadle B$^5$. The cam $e^4$ is employed to lift the last against the closed-in heel-jaws $d^4$ to break down and set the quarter and counter-stiffener, claimed in United States Patent No. 251,430, granted to C. W. Glidden, December 27, 1881.

My machine herein described will in practice be provided with toe and heel jaws $d^3$ $d^4$, which will be mounted on the toe and heel carriages, and be operated as in the said Glidden patent or in any other well-known manner. The upper, having been drawn over the toe of the inner sole upon the last, will be tacked in place, and the last will be placed on the heel-pin, and the toe and heel carriages will then be moved sufficiently in a horizontal direction to place the usual hold-downs, 2, over the toe and heel of the last and in engagement with the shoe to be lasted, they being passed over the upper and inner sole thereon, and the usual steel heel-clamp, $f$, with its india-rubber backing $f^2$, will be moved to grasp the quarter of the shoe and clamp it firmly against the heel of the last. In such condition the presser, which is to force the upper against the top of the foot of the last at its median line, will be lifted against the upper. This presser is composed of a metal block, $g$, faced preferably with india-rubber, as at 4, and covered with leather, as at 5, to protect the rubber from oil. This presser is pivoted upon the upper end of a rod, $g'$, at 15, and the rod $g'$ is pivoted in turn at $g^2$ on a slide-bar, $g^3$, having a roll, $g^4$, which is acted upon at the proper time to lift the presser by a cam, $g^5$, fast upon the rocking sleeve $e^5$. The cams $e^4$ and $g^5$ on the same sleeve, $e^5$, are so shaped and placed with relation to each other and are so sloped that cam $e^4$ acts at a later period of time than cam $g^5$ during the depression of the treadle $B^5$. The difference in the shape of these two cams will be seen in Fig. 2, where cam $e^4$ is shown in dotted lines. The presser $g$, in order that it may be moved backward and forward with the toe-carriage and usual toe-rest, and be changed in position to operate with lasts of different shapes, is connected by links $h$ $h$ with a part of the toe-carriage $d'$, the connection being made by a pin, 16. The presser having been raised against the upper covering, the top of the foot of the last along the median line of the upper (the last being held down in place) acts to impinge the upper closely against the last at its median line, so that the upper cannot slip on the last. At the same time that the presser is so lifted, or a little later, the treadle $B^5$ is depressed far enough to operate the levers B and arms $b$ to place the upper ends of the holders $m$, composed of arms or levers pivoted at 6 on ears of the arms $b$, against the upper just below the side edges of the last, as shown in the detail, Fig. 7, and the said holders are retained pressed against the said upper with a force measured by the adjustable springs $m^2$, such pressure being sufficient to prevent the upper slipping back after it has been drawn or stretched about the last by suitable pinchers, operated preferably by hand, as in hand-lasting, the said pinchers stretching the upper from the point where the upper is held by the presser $g$ to its edge. To enable this stretching of the upper by pinchers to be done, I have so placed the plates $b^2$ that the upper is not covered by them, but is preferably in all parts accessible to the pinchers. This I do by leaving space between these plates $b^2$, or by placing the plates $b^2$ so far back of the holders $m$, as seen in Fig. 7, that there is room for the pinchers to seize the upper and draw it tight to the last, while the holders $m$ retain the upper in place until it has been drawn tight all round the shoe. The treadle is then further depressed, and the plates $b^2$ close in and bend or last the edges of the upper over the insole, where they are fastened by tacks or other fastenings. After the upper all about the edge of the last has been drawn up and about the last by the pinchers the treadle $B^5$ will be yet further depressed to move the levers B and arms $b$ so far as to cause the side-lasting devices $b^2$ to pass over the bottom of the last, it being uppermost in the machine, as shown in Fig. 2, the said side-lasting devices carrying with them the edges of the upper, then projecting above the holders $m$, and the inner sole, 18, on the last L. The holders $m$ will preferably be faced with leather. Each holder has connected with it a rod, 7, which is extended backward through a passage made therefor in one of the arms $b$ and through the spring $m^2$, and a tubular nut, 10, which is screwed into the said opening to form an adjustable abutment for one end of the said spring, so that its force on the holder $m$ can be varied, as may be desired, according to the work being done. The said springs serve to enable the holders $m$ to first come in contact with the upper and rest there, while the side-lasting devices $b^2$ remain at a sufficient distance back from the edge of the last and upper to permit the operator to engage the edges of the upper by means of pinchers and stretch and draw the upper about the last, the upper moving up between the last and holders; but the holders prevent the upper slipping back after it has been so stretched. As the side-lasting devices $b^2$ are crowded over the last the spring $m^2$ is compressed and the rod 7 forced backward, as shown at the left of Fig. 2. The nut 12 on the rod 7 limits the forward position of the holder with relation to the front ends of the side-lasting devices.

It will be understood that I shall use any desired number of arms $b$ and side-lasting devices $b^2$, they being extended along each side of the last between the heel and toe jaws or plates, each device $b^2$ having another side-lasting device opposite it, although in the drawings I have not so shown them, some of the arms $b$ and devices $b^2$ having been omitted to avoid confusion in the drawings.

The levers B at their upper ends are shaped to engage notched parts of the arms $b$, so that the levers open and close the said arms positively.

I claim—

1. The last, a toe-rest, and hold-down to keep the last in position, and the presser to force the upper in contact with and hold it against the top of the foot of the last, combined with the holders $m$ to bear against the upper near the edges of and about the fore part of the last, and with springs to force the said holders against the upper and prevent its slipping back over the last, after being stretched about the last between the presser and the edges of the last, substantially as described.

2. The last, hold-downs to keep the last in position, and the presser having vertical movement, and adapted to impinge the upper between it and the top of the foot of the last, and to hold the upper in place on the last after the hold-downs have engaged the shoe to be lasted, combined with means, substantially as described, to enable the presser to be moved horizontally to adapt it to lasts of different lengths, substantially as described.

3. In a lasting-machine, one or more pairs of holders, $m$, and arms $b$, arranged at opposite sides of the last, combined with adjustable springs to regulate the force or pressure of the holders against the stretched upper on opposite sides of the last, substantially as described.

4. The arm $b$ and adjustable nut 10, combined with the holder, its rod 7, spring, and check-nut, to operate substantially as described.

5. The last, last-holding pin, toe-rest, hold-downs to keep the last in place, a presser to impinge the upper against the top of the foot of the last, and a series of holders, $m$, acted upon by springs to hold the upper against the sides of the last along its edges while the upper, the edges of which are exposed, is being stretched by hand-pinchers, and side-lasting devices, combined with means, substantially as described, to lift the presser, and then the last-holding pin and heel of the last, the heel of the last being lifted after the closing together of the usual heel-lasting jaws or devices, substantially as and for the purposes described.

6. The holders $m$, and the mechanism for pressing them against the upper, and the lasting devices $b^2$, so placed as to leave the upper exposed, to be seized by the pinchers in the hands of the operator and drawn up around the last prior to the closing in of the lasting devices $b^2$, substantially as described.

In testimony whereof I have signed my name to this specification in the presence of two subscribing witnesses.

GORDON McKAY.

Witnesses:
   G. W. GREGORY,
   B. J. NOYES.